United States Patent Office

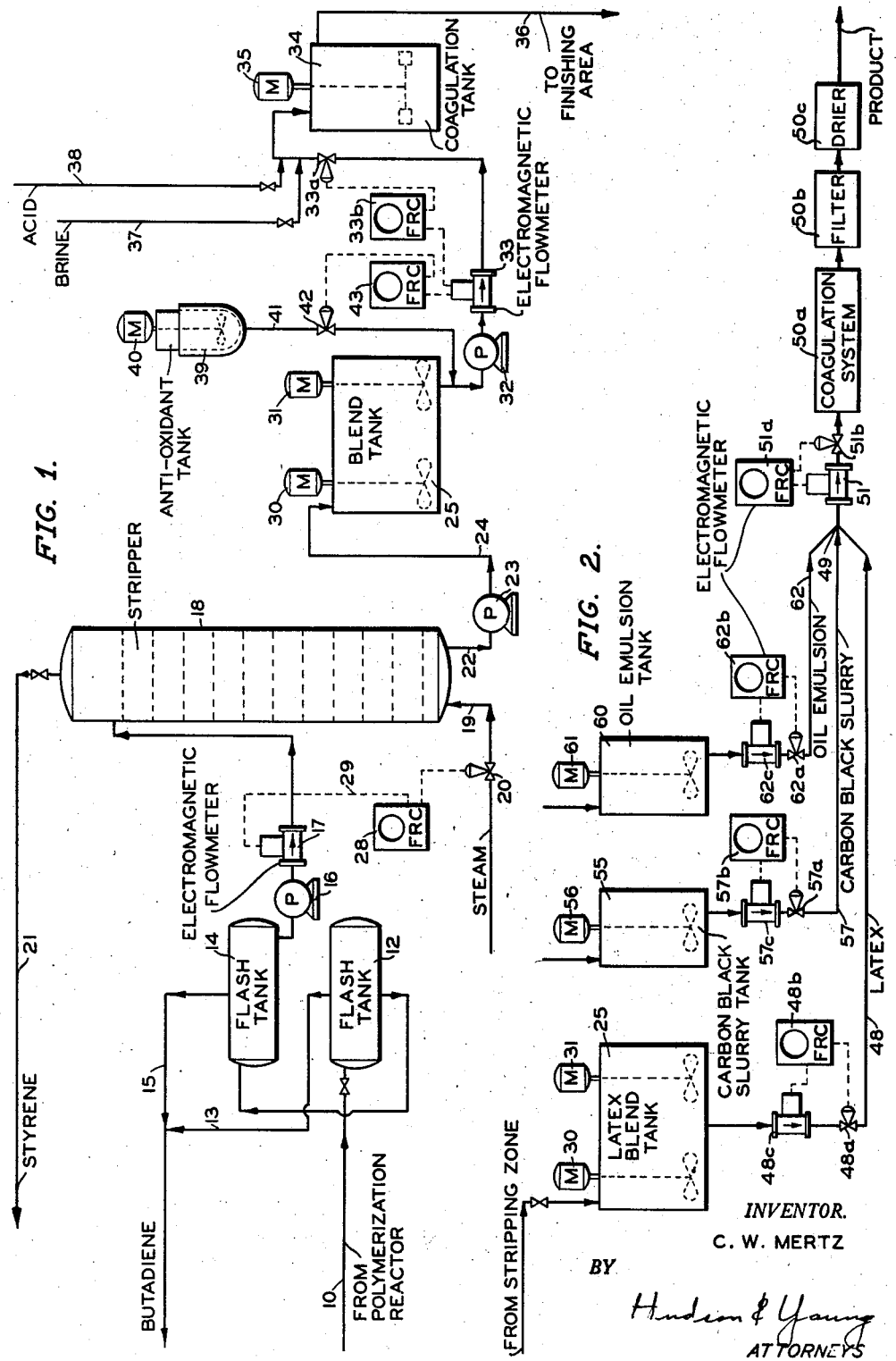

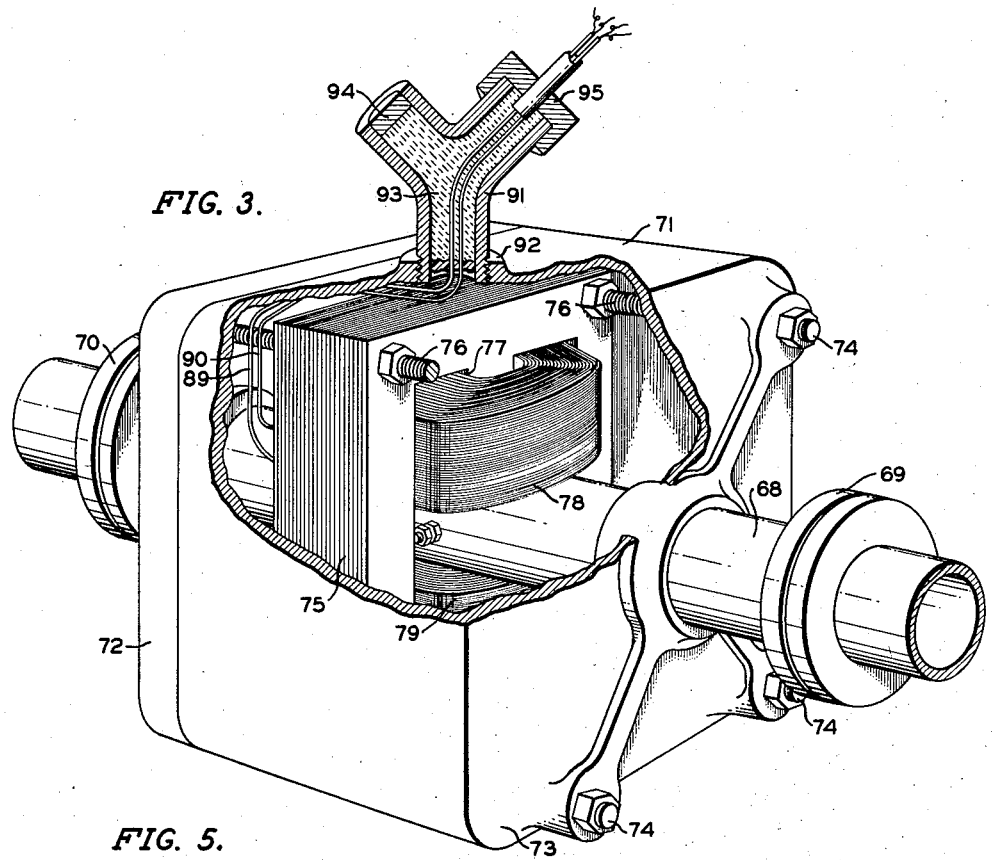

2,844,568
Patented July 22, 1958

2,844,568

INDICATING AND/OR CONTROL SYSTEM AND METHOD

Clyde W. Mertz, Bartlesville, Okla., assignor to Phillips Petroleum Company, a corporation of Delaware Application October 10, 1955, Serial No. 539,517

14 Claims. (Cl. 260—83.7)

This invention relates to an indicating and/or control system and method. In one aspect, it relates to a method for indicating the rate of flow of latex to a stripping column. In another aspect, it relates to indicating the rate of flow of latex to a coagulation tank or other vessel. In still another aspect, it relates to indicating the flow rate of a blend of latex with other components. In still another aspect, it relates to control of stripping, blending or coagulation operations by signals derived from such indicators.

Considerable difficulty has been experienced in properly determined the flow rate of latex in various blending, stripping, coagulation, and finishing operations. These difficulties arise, to a large extent, from plugging of conventional type flowmeters by solids deposited out from the latex upon the flowmeter equipment. For example, in the steam stripping of a monomer from latex, most efficient results are obtained where there is a predetermined relationship between the amount of stripping steam and latex introduced into the column. Prior to the present invention, it was necessary to set the rate of steam addition manually on the basis of an estimated latex feed rate, this causing inefficient operation.

Also in one important step in latex finishing, an oil emulsion and/or carbon black slurry is added to the latex prior to coagulation. Prior to the present invention, these ingredients were metered by a gravimetric tower, and difficulties arose from collection of rubber and carbon black deposits on the surface of the gravimetric towers. Further, adequate blending is oftentimes not obtained because of the intermittent mixture of large quantities of ingredients in the weight tower system, and the required short hold-up time due to instability of the mixture. Finally, prior to the present invention considerable difficulty was encountered in maintaining uniform flow of latex and anti-oxidant in a selected ratio to a coagulation tank.

In accordance with this invention, the foregoing difficulties are entirely overcome or substantially alleviated by magnetic or electromagnetic measurement of the latex flow rate. In the aforementioned operations, the latex is passed through a non-magnetic tube which has an alternating electromagnetic field induced therein by a coil. Electrodes are placed at the inner surface of the tube in the magnetic field. An output appears across the electrodes which is linear and directly proportional to the average velocity of the flowing latex which is, in turn, proportional to the volume flow rate. The production of an output in this manner substantially eliminates difficulties due to plugging, and permits accurate control of the steam-latex flow ratio to the stripping column, continuous and accurate blending of the ingredients of a masterbatch containing latex, and one or both of an oil emulsion and carbon black slurry. Finally, production of such output permits antioxidant or other ingredients to be accurately metered to a coagulation vessel in accordance with the rate of flow of latex into that vessel.

Accordingly, it is an object of the invention to provide an improved system for producing an output representative of the flow rate of latex.

It is a further object to utilize such output in the control of latex stripping operations, blending operations, and admixture of processing ingredients with the latex in desired proportions.

It is a still further object to accomplish the foregoing in an efficient manner, at low cost, and with a substantial increase in the reliability of plant control, and efficient utilization of plant facilities.

Various other objects, advantages and features of the invention will become apparent from the following detailed description taken in conjunction with the accompanying drawings, in which:

Figure 1 is a flow diagram of a plant utilizing the indicating and/or control system of the invention;

Figure 2 is a flow diagram of a latex blending operation controlled in accordance with the invention;

Figure 3 is a perspective view of the electromagnetic flow-measuring device with the casing partially broken away;

Figure 4 is an enlarged sectional view, partially broken away, showing the electrodes; and Figure 5 is a circuit diagram of the servomechanism.

Referring now to Figure 1, I have illustrated a portion of a latex stripping and coagulation system for the processing of synthetic rubber latices of butadiene and styrene. As will be better understood upon reading the detailed description, the invention is applicable, insofar as the stripping operation is concerned, to various other types of latices where unreacted monomers are separated from the product by a stripping medium, such as steam.

Insofar as the blending or additive supplying steps are concerned, the process is applicable to various latices where compounding ingredients or coagulation ingredients are added to the latex stream in controlled amounts based upon the amount of latex present.

In particular, conjugated dienes other than butadiene can be employed which contain from four to eight, inclusive, carbon atoms per molecule and include, 1,3-butadiene, isoprene (2-methyl-1,3-butadiene), piperylene, 2-methyl-1,3-pentadiene, 2,3-dimethyl-1,3-butadiene, chloroprene, and others. In a broader aspect of the invention, conjugated dienes having more than eight, such as twelve, carbon atoms per molecule can be used, particularly where the presence of various isomeric compounds can be tolerated. Furthermore, various alkoxy, such as methoxy and ethoxy, and cyano derivatives of these conjugated dienes, are also applicable. Thus, dienes, such as phenyl-butadiene, 2,3 - dimethyl - 1,3 - hexadiene, 2 - methoxy-3-ethyl butadiene, 2-ethoxy-3-ethyl-1,3-hexadiene, 2-cyano-1,3-butadiene, and 2,3-diethyl-1,3-octadiene are applicable.

The conjugated diene can be copolymerized with other monomers including those containing an active $CH_2=C<$ group such as aryl olefins, esters of acrylic and substituted acrylic acids, nitriles, amides, ketones, ethers, and halides. Specific examples of such copolymerizable monomers include styrene, various alkyl and substituted alkyl styrenes, p-chlorostyrene, p-methoxystyrene, alpha-methyl-styrene, vinylnaphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, vinylacetylene, and the like.

Further, the copolymer can include polymerizable heterocyclic nitrogen bases of the pyridine and quinoline series. Examples of such compounds are 2-vinylpyridine;

2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methyl-phenyl)-3-vinyl-4-methylpyridine; 3-vinyl-5-(hydroxyphenyl)pyridine; 2-vinyl-quinoline; 2-vinyl-4-ethylquinoline; 3-vinyl-6,7-di-n-propyl-quinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

In some cases, the invention is applicable to latices not including a conjugated diene where the problem of stripping unreacted monomer occurs.

While the invention is described in connection with butadiene-styrene latices, and specific operating conditions suitable for handling these latices are given, it will be understood that these operating conditions may vary where other latex systems are utilized, as those skilled in the art will readily understand.

In the aforesaid specific example, the latex containing unreacted butadiene and styrene is fed through a line 10 from a polymerization reactor to a flash tank 12 where the butadiene is flashed off. Suitable conditions for the flash tank are a temperature of 100 to 115° F. and a pressure of 3 to 5 pounds per square inch gage. The unreacted butadiene is withdrawn to a recovery system through a line 13 and the latex passes to a second flash tank 14 where additional butadiene is removed. Suitable conditions for operation of the flash tank 14 are a temperature of 100° F. and a pressure of 150 to 180 millimeters of mercury absolute. The unreacted butadiene from the flash tank 14 is recovered through a line 15 while the stripped latex passes through a pump 16 and an electromagnetic flowmeter 17 to a stripping vessel 18.

Steam is admitted to the column 18 through a line 19, the rate of flow being controlled by a motor valve 20. The styrene stripped from the latex passes overhead through a valved line 21 while the stripped latex is withdrawn through a line 22. Suitable conditions for this stripping column are a pressure of 50 to 70 millimeters of mercury, a top temperature of 100° F. and a bottom temperature of 130° F. The stripped monomer is passed by a pump 23 through a line 24 to a blend tank 25. A flow recorder controller 28 is operatively connected to the motor valve 20, and this controller has a settable element which is controlled, as indicated by dotted line 29, by the electromagnetic flowmeter 17.

In accordance with the invention, the electromagnetic flowmeter accurately measures the rate of flow of latex through the feed line to the column, and this flowmeter is utilized to control the amount of stripping steam fed to the column. This result is effected by setting the rate of flow controller 28 automatically in accordance with the reading of the flowmeter.

In general, with a cold rubber latex at a 60 percent conversion level, 100 pounds of steam per hour per gallon per minute of latex fed to the stripping column are required to provide a maximum residual styrene content of 0.2 to 0.4 percent. Other synthetic rubber latices may require from 50 to 150 pounds of steam per hour per gallon per minute of latex to meet the specification of maximum unreacted monomer, while other types of latices, of course, will require different amounts of steam.

The accurate control of the steam by the electromagnetic flowmeter provides important advantages in the stripping operation. In particular, if the amount of steam is in excess of that required to reduce the residual monomer content of the latex to its predetermined value, the temperature in the stripping column 18 rises and rubber deposits upon the trays of the column, thus necessitating frequent cleanup operations. Of course, steam is also wasted in such operation. On the other hand, if the supply of steam is insufficient, the stripped latex does not meet the requirements of maximum permissible unreacted monomer content. Thus, the present system provides a distinct improvement in control of the stripping operation.

It will be understood that the output of the flowmeter can be used either to control directly the steam flow rate, or to override a normal control setting on the flow recorder controller 28.

It will be noted that the blend tank 25 is provided with motor-driven stirrers 30, 31 and that the material from this tank is passed through a pump 32 and an electromagnetic flowmeter 33 to a coagulation tank 34 provided with a motor-driven stirrer 35. The coagulated latex is withdrawn from the tank 34 by a line 36 for passage to the finishing area. Coagulating ingredients, such as acid or brine, are admitted to the tank 34 by valved lines 37 and 38.

In one specific example, sufficient acid is fed to the coagulation tank to maintain a pH within the range of 1.5 to 3.5 and brine is introduced through line 37 in an amount within the range of 0.005 to 0.09 pound per pound of polymer ingredients.

Further in accordance with the invention, there is provided an anti-oxidant tank 39 with a motor driven stirrer 40 through which material is discharged through a line 41 to the latex stream leaving the blend tank 25. The rate of flow of anti-oxidant is controlled by a motor valve 42 which is operatively connected to a flow recorder controller 43 having a settable element connected to the flow meter 33.

It is important that the anti-oxidant be introduced in an amount sufficient to prevent decomposition of the polymer without, of course, utilizing an excessive quantity. Suitable anti-oxidants are hydroquinone, monobenzyl ether, phenyl-beta-naphthylamine, polymerized trimethyl-dihydroquinoline, heptylated diphenylamine, the glycerol monoester of salicylic acid, hexachloronaphthalene, poly diarylamine, and hydrocarbon waxes, which are introduced in a predetermined quantity usually within the range of 1 to 5 parts by weight per 100 parts of polymeric material.

The introduction of the anti-oxidant in the desired proportion is efficiently and effectively controlled by the flowmeter 33 operating in concert with the flow recorder controller 43, and the proportion of anti-oxidant to latex is accurately maintained despite surges in the flow of latex from the blend tank. In this manner, decomposition of the polymer is effectively prevented without utilizing an excessive amount of the expensive anti-oxidant material. Also, this same flowmeter can control the rate of flow of latex to the coagulation tank 34. To this end, I have provided a motor valve 33a in the inlet line to the coagulation tank, this valve being operatively connected to a flow recorder controller 33b which has a settable element connected to the flowmeter 33.

Referring now to Figure 2, I have shown a system wherein latex can be continuously and accurately blended in desired proportions with one or both of a carbon black slurry and oil emulsion. In this system, material from the latex blend tank 25 is fed through a line 48 to a mixing zone 49 and an outlet conduit which leads to a coagulation system 50a, a filter 50b and a drier 50c. An electromagnetic flowmeter 51 is connected in the conduit 50 and this unit controls a settable element on a flow recorder controller 51a operatively connected to a motor valve 51b in the conduit 50. This enables the flow to the units 50a, 50b and 50c to be accurately controlled so that these units can operate at maximum capacity, which was not possible with the gravimetric towers previously used. The rate of flow of latex through line 48 is controlled by a motor valve 48a operatively connected to a flow recorder controller 48b which has a settable element connected to an electromagnetic flow meter 48c in the line 48.

The system further includes a carbon black slurry tank 55 having a motor driven stirrer 56. The slurry includes carbon black together with sufficient water to provide a 5 to 25 weight percent slurry of the black, for example, 900 parts by weight of water per 100 parts of carbon black. The slurry is maintained by a dispersing agent which is constituted of 0.1 to 0.5 part, preferably 0.27 part, of an alkaline material, such as potassium hydroxide, together with 0.1 to 5, preferably 2 parts of a surface acting agent, such as sodium lignin sulfonate.

This slurry is fed to the mixing zone 49 through a line 57 flow through which is controlled by a motor valve 57a operatively connected to a flow recorder controller 57b which has a settable element connected to a flowmeter 57c in the line 57.

Finally, the system includes an oil emulsion tank 60 having a motor driven stirrer 61 containing an emulsion of water with any suitable oil having the desired characteristics for inclusion in the masterbatch, such oils being well known to those skilled in the art. The oil is withdrawn from the tank 60 through a line 62 and passed to the mixing zone 49. Flow through the line 62 is controlled by a motor valve 62a operatively connected to a flow recorder controller 62b which has a settable element connected to a flowmeter 62c in the line 62.

In accordance with the invention, the settable elements on the controllers 48b, 57b and 62b are adjusted to provide a desired ratio between the latex, carbon slurry and oil emulsion fed to the mixing zone 49. This accurately maintains the ingredients in desired proportions and completely eliminates difficulties resulting from the use of gravimetric towers for measuring the components of the masterbatch. By the use of the electromagnetic flowmeters, the ingredients can be continuously mixed which was heretofore impractical with other types of flowmeters due to the plugging and inaccurate measurement of latex flow.

Referring now to Figures 3 and 4, I have shown an electromagnetic flowmeter suitable for measuring the flow rate of the latex as described in connection with Figures 1 and 2. This flowmeter includes a central conduit 68 having flange connections 69 and 70 to the line in which the flowmeter is inserted. Secured to the conduit 68 is an explosion-proof housing formed from a central section 71 of rectangular cross section having two end plates 72, 73 secured thereto by bolts 74.

Mounted within the housing is a core formed from a set of generally rectangular laminations 75 secured together by bolts 76. These laminations have two sets of arms protruding inwardly to a position closely spaced to the conduit 68, one of these arms being indicated by reference numeral 77. These arms carry a pair of winding units 78, 79 which are energizable by supply of alternating current thereto to provide a magnetic field extending transversely of the conduit, and to supply a reference voltage to the servomechanism hereafter described Mounted within the conduit 68 is a sleeve 80 of insulating material, and a pair of metal electrodes 81, 82 extend through the conduit and sleeve, these electrodes being received within a pair of insulating bushings 83, respectively, and being secured in position by nuts 84 cooperating with terminal elements 85, metal washers 86 and insulating washers 87, respectively.

These electrodes are preferably and advantageously disposed in diametrically opposite position and along a diameter of the conduit which is generally perpendicular to the magnetic field or a component thereof produced by the winding units 78 and 79. In some cases, a permanent magnet can be used instead of the electromagnet.

Consequently, as latex flows through the conduit, each elemental flat disc of latex develops a voltage as it goes through the magnetic field in accordance with Faraday's law, and this voltage is measured by the electrodes 81 and 82. It will be evident that the voltage is directly proportional to the volume flow rate of latex through the conduit.

The leads to the electrodes and winding units are brought out by two cables 89 and 90 which extend through a Y-fitting 91 received within a threaded opening 92 in the housing section 71. The Y-connection is filled with a sealing compound 93 one arm of the Y having a frangible disc 94 inserted therein and the other arm being provided with a closure cap 95 making a sealing connection with the cables 89 and 90. In this manner, access is had to the leads without impairing the explosion-proof nature of the instrument.

The use of this electromagnetic flowmeter in measuring latex flow is not impaired by buildup of solid material on the inside of the pipe, and turbulence or variation in the flow profile do not affect the output of the reading so that straightening vanes are unnecessary. Further, the pressure drop through the instrument is very low, and there are no pockets, crevices or openings in which foreign material can be trapped.

Referring now to Figure 5, it will be noted that the windings on the core legs 77 include a field coil 97 connected to an alternating current source 98 together with a reference voltage coil 99 which is connected to the primary winding of a transformer 100, the secondary winding of which has a center-tap connected to ground, and an end terminal connected through a pair of variable resistances 101 and 102 to one terminal of a potentiometer 103, the other end terminal being connected through a condenser 104 to the junction between variable resistances 101 and 102.

The electrodes 81 and 82 are connected by leads 105 and 106 to a preamplifier 107 the output of which is fed to a power amplifier 108 connected to a servomotor 109.

In the unit 107, a reference voltage appearing between the contactor of potentiometer 103 and the upper terminal thereof is compared with the signal across the electrodes 81, 82, and the motor 109 is mechanically connected to the contactor of this potentiometer to drive the comparison voltage to zero. Thus, the position of the motor shaft and the contactor of potentiometer 103 are directly indicative of the voltage appearing between the electrodes 81, 82 and thus of the latex flow rate through the conduit 68. This mechanical output is utilized to actuate a recorder 110 and, in certain embodiments of the invention, the shaft of the motor is directly connected or connected through suitable telemetering devices to the settable elements of the flow recorder controller which are actuated in accordance with the latex flow rate. This connection is illustrated by the dotted lines connecting the flow recorder controllers 27, 28, 43 and 53, 59, 64 to their respective electromagnetic flowmeters in Figures 1 and 2. In this manner, the electromagnetic flowmeter is utilized both for indicating purposes and for automatic control of the processes in the manner previously described in detail.

While the invention has been described in connection with present, preferred embodiments thereof, it is to be understood that this description is illustrative only and is not intended to limit the invention.

I claim:

1. The method of determining the flow rate of a synthetic latex rubber comprising a conjugated diene which comprises flowing said latex between a pair of electrodes positioned along a line substantially perpendicular to the path of latex flow, inducing a magnetic field in said latex at the region of said electrodes and generally perpendicular to a line connecting said electrodes, and indicating the resulting electrical potential appearing across said electrodes.

2. The method of determining the flow rate of a synthetic butadiene-styrene latex rubber which comprises flowing said latex between a pair of electrodes positioned along a line substantially perpendicular to the path of latex flow, inducing an alternating electromagnetic field in said latex at the region of said electrodes and generally perpendicular to a line connecting said electrodes, and indicating the resulting electrical potential appearing across said electrodes.

3. The method of controlling a process wherein a fluid is admixed with a latex which comprises flowing said latex between a pair of electrodes, producing an alternating electromagnetic field having a component perpendicular to a line joining said electrodes, producing an output representative of the electrical potential appearing between said electrodes, admixing said fluid with said latex, and controlling the rate of flow of said fluid in accordance with the magnitude of said output so as to maintain a predetermined relationship between the amount of fluid and the amount of latex supplied to the admixing zone.

4. The method of controlling the stripping of an unreacted monomer from a latex containing polymeric material which comprises flowing said latex stream between a pair of electrodes and thence to a stripping zone, contacting the latex in said zone with a stripping medium to remove said unreacted monomer, producing a magnetic field having a component perpendicular to a line joining said electrodes, producing an output representative of the electrical potential developed across said electrodes, and controlling the rate of flow of said medium to the stripping zone in accordance with said output so as to provide a predetermined relationship between the amount of latex and amount of stripping medium fed to said stripping zone.

5. The method of stripping unreacted monomers from a butadiene-styrene latex which comprises flashing said latex to remove unreacted butadiene, passing the resulting latex containing unreacted styrene between a pair of electrodes and thence to a stripping zone, contacting said latex with steam in the stripping zone to remove said unreacted styrene, producing an alternating electromagnetic field having a component perpendicular to said electrodes, producing an output representative of the resulting electrical potential appearing between said electrodes, and regulating the amount of steam supplied to the stripping zone in accordance with said output so as to maintain a predetermined relationship, within the range of 50 to 150 pounds of steam per hour per gallon per minute of latex, between the steam and latex fed to the stripping zone.

6. Control apparatus comprising, in combination, a latex stripping column having a latex feed line connected to the upper portion thereof, a stripping medium introduction line connected to the lower portion thereof, a line for withdrawing stripping material connected to the top thereof, and the line for withdrawing stripped latex connected to the bottom thereof, an electromagnetic flowmeter in said feed line comprising a pair of electrodes at diametrically opposite positions in said feed line, a core, a winding thereon to impress a magnetic field on the latex in the feed line having a component perpendicular to the diametric line connecting said electrodes, a source of stripping medium connected to said stripping medium inlet line, a motor valve in said stripping medium line, a flow controller operatively connected to said motor valve and having a settable element, and servomechanism connecting said pair of electrodes to said settable element to vary the position of said settable element in accordance with the potential developed across said electrodes.

7. The method of controlling the amount of a fluid additive fed to a latex stream which comprises flowing said latex stream between a pair of electrodes, producing a magnetic field having a component perpendicular to said electrodes, producing an output representative of the electrical potential developed between said electrodes, and regulating the amount of said additive fluid supplied to the latex stream in accordance with said output to maintain a predetermined relationship between the amount of latex and the amount of additive.

8. The method of controlling the amount of an anti-oxidant fluid supplied to a butadiene-styrene latex stream which comprises flowing said latex stream into a coagulation vessel between a pair of electrodes, producing an alternating magnetic field having a component perpendicular to said electrodes, producing an output representative of the electrical potential developed between said electrodes, and regulating the amount of said anti-oxidant fluid supplied to the latex stream in accordance with said output to maintain a predetermined relationship between the amount of latex and the amount of anti-oxidant.

9. The method of controlling the amount of an anti-oxidant fluid supplied to a butadiene-styrene latex stream which comprises flowing said latex stream into a coagulation vessel between a pair of electrodes, producing an alternating magnetic field having a component perpendicular to said electrodes, producing an output representative of the electrical potential developed between said electrodes, and controlling the flow of latex into said coagulation vessel in accordance with the same output representative of the electrical potential developed between said electrodes.

10. Control apparatus comprising, in combination, a coagulation tank, an inlet line connected thereto, a pump in said line, a vessel containing an anti-oxidant solution, a pipe connecting said vessel to said line, a motor valve in said pipe, a flow controller operatively connected to said motor valve and having a settable element, an electromagnetic flowmeter in said line including a pair of diametrically opposed electrodes positioned in said line, and means for establishing an alternating magnetic field in said line having a component perpendicular to the diametric line connecting said electrodes, and servomechanism connected to said electrodes and responsive to the electrical potential appearing thereacross, said servomechanism being operatively connected to said settable element to adjust said settable element in accordance with said electrical potential.

11. The method of controlling a latex stream including a master batch component selected from the group consisting of an oil emulsion and a carbon black slurry which comprises passing the admixed stream of latex and master batch component between a pair of electrodes, producing a magnetic field having a component normal to a line connecting said electrodes, producing an output representative of the electrical potential appearing between said electrodes, and controlling the rate of flow of said master batch in accordance with said output to maintain a predetermined flow of said admixed stream, coagulating said admixed stream, filtering the coagulated stream, and drying the filtered stream.

12. A control process which comprises admixing a butadiene-styrene latex, a carbon black slurry, and an oil emulsion to form a master batch, passing the master batch between a pair of electrodes, producing an alternating magnetic field having a component perpendicular to said electrodes, producing an output representative of the electrical potential developed between said electrodes, and controlling flow of said master batch in accordance with said output so as to provide a predetermined flow rate to a subsequent coagulation step.

13. An electromagnetic flowmeter comprising, in combination, a conduit section, a pair of electrodes extending into said conduit section and disposed at diametrically opposed locations therein, a core of paramagnetic material, a coil wound on said core to establish a magnetic field generally perpendicular to a line connecting said electrodes, and an explosion-proof metal casing secured to said conduit section and enclosing said electrodes, said core and said coil, a Y-type fitting secured to said housing and communicating with the interior thereof, leads extending from said electrodes and said coil through the housing and one leg of the Y-connection, a sealing compound in said Y-connection, a cap closing the arm of said Y-connection through which said leads extend, and a frangible disk disposed in the other arm of said Y-connection.

14. The method of controlling the flow rate of a synthetic latex rubber comprising a conjugated diene which comprises flowing said latex between a pair of electrodes positioned along a line substantially perpendicular to the path of latex flow, inducing a magnetic field in said latex at the region of said electrodes and generally perpendicular to a line connecting said electrodes, indicating the resulting electrical potential appearing across said electrodes, and controlling the rate of flow of said latex in accordance with said electrical potential appearing across said electrodes.

References Cited in the file of this patent

UNITED STATES PATENTS

| | | |
|---|---|---|
| 2,309,401 | Kollsman | Jan. 26, 1943 |
| 2,451,332 | Green | Oct. 12, 1948 |
| 2,459,748 | Johnson | Jan. 18, 1949 |
| 2,685,796 | Romanowski et al. | Aug. 10, 1954 |

OTHER REFERENCES

Brothman et al.: Chem. & Met. Eng., March 1943, pp. 108–12.

Rostler: Rubber Age, vol. 69, #5, pp. 559–78.